United States Patent [19]

Sugita et al.

[11] Patent Number: 4,876,143

[45] Date of Patent: Oct. 24, 1989

[54] ROD MATERIAL

[75] Inventors: Minoru Sugita; Teruyuki Nakatsuji; Tadashi Fujisaki; Minoru Sawaide; Noboru Ishikawa; Yasuo Inada, all of Tokyo, Japan

[73] Assignees: Shimizu Construction Co., Ltd., Tokyo; Dainihon Glass Industry Co., Ltd., Sagamihara; Kyojin Rope Manufacturing Co., Ltd., Kuki, all of Japan

[21] Appl. No.: 881,697

[22] Filed: Jul. 3, 1986

[30] Foreign Application Priority Data

Jul. 5, 1985 [JP] Japan ............................ 60-148010

[51] Int. Cl.[4] .............................................. D02G 3/00
[52] U.S. Cl. .................................... 428/294; 428/357; 428/364; 428/369; 428/375; 428/385; 428/386; 428/391; 428/392; 428/395
[58] Field of Search ............... 428/294, 295, 902, 408, 428/357, 364, 371, 375, 385, 386, 391, 392, 395

[56] References Cited

U.S. PATENT DOCUMENTS

| | | | |
|---|---|---|---|
| 3,298,152 | 1/1967 | Lockshaw | 52/655 X |
| 3,685,862 | 8/1972 | Rudolf | 52/655 |
| 3,704,561 | 12/1972 | Meyer | 52/309.16 X |
| 3,851,786 | 12/1974 | Kaemper | 52/309.16 X |
| 4,276,337 | 6/1981 | Coonrod | 52/309.16 X |
| 4,578,301 | 3/1986 | Currie et al. | 428/110 X |
| 4,706,430 | 11/1987 | Sugita et al. | 428/109 |

Primary Examiner—James J. Bell
Attorney, Agent, or Firm—Oblon, Spivak, McClelland, Maier & Neustadt

[57] ABSTRACT

A rob material includes an elongated matrix made of synthetic resin, a plurality of first elongated textile elements, and a plurality of second elongated textile elements, the first and second elements being embeded within the matrix, parallel to each other along the matrix, each of the first elements being composed of a plurality of yarns braided together, the second elements having a lower breaking elongation rate than said first elements. In such a rod material, the second elements have a substantially complete elasticity, and the first elements have such an elongation rate as to elongate further after the fracture of the second elements. Therefore, the stress-strain curve of the rod material shows a high elastic modulus in the elastic region and a high breaking elongation rate. In other words, the stress-strain behavior is similar to that of steel rods.

17 Claims, 6 Drawing Sheets

FIG. 11
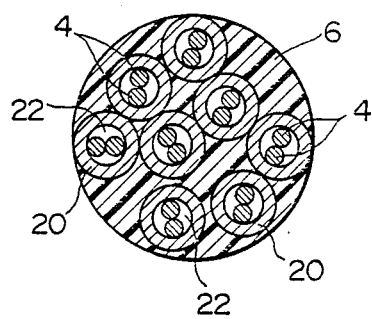
FIG. 12 EXAMPLE I
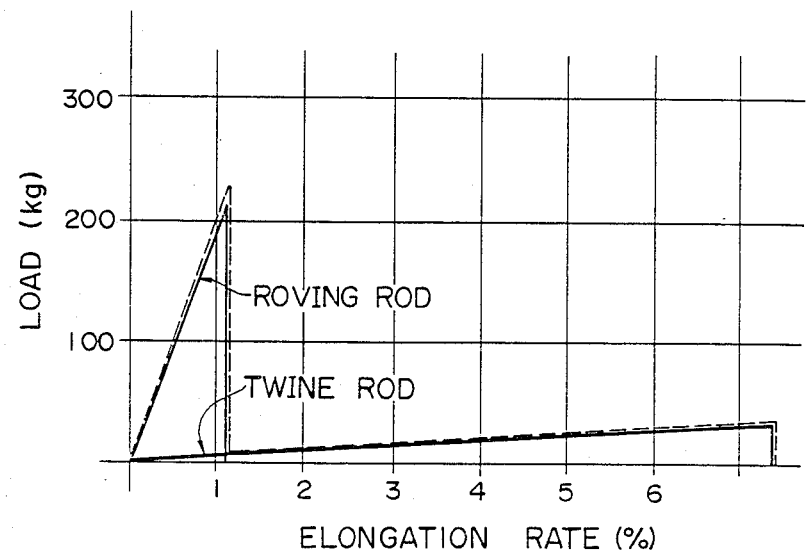

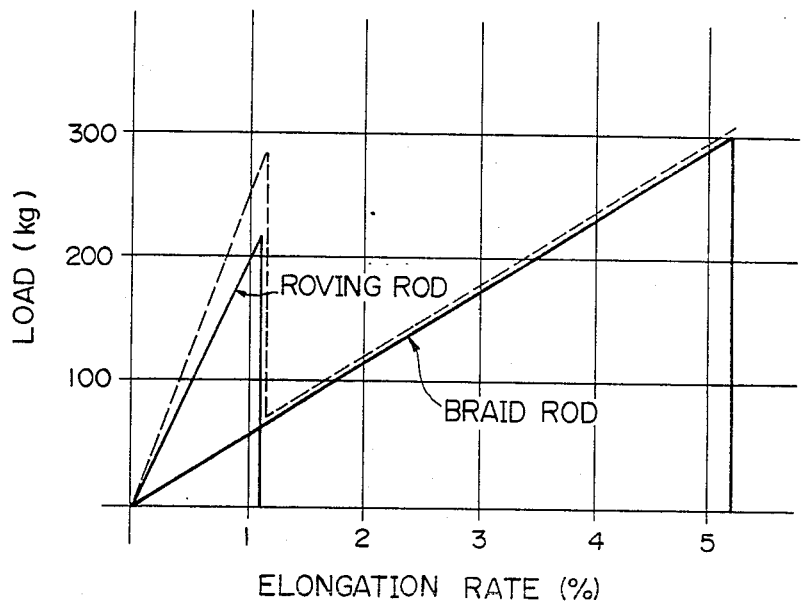
FIG. 13 EXAMPLE 2
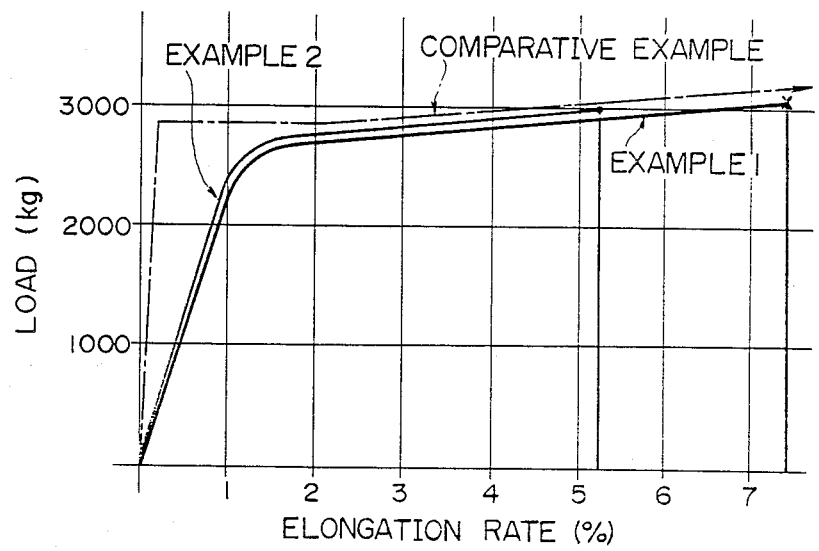
FIG. 14

ROD MATERIAL

BACKGROUND OF THE INVENTION

The present invention relates to an FRP rod material used as a building material, e.g., a reinforcing bar in place of steel rods.

So called FRP (Fiber-Reinforced Plastic) has been in widespread use in a variety of construction materials because it has a high specific strength, good anticorrosion properites, excellent moldability, shape workability, and the like. For example, if FRP rods are used as reinforcing bars in place of steel rods, the reinforcing bars are prevented from being corroded by salt improving the durability of the building. In addition, FRP rods are lightweight, and thus easy to handle at a construction site.

In the prior art, Takahasi, et al., U.S. patent application Ser. No. 06/849,856 entitled "REINFORCING MEMBER HAVING A PROJECTION ON ITS SURFACE", filed on Apr. 9, 1986 discloses a reinforcing member as a substitute for a steel bar, having a synthetic resin core and projections on the surface of the core. This core is a FRP rod having a bundle of continuous fibers, such as rovings, and a synthetic resin bonding the fibers together to form the core.

However, conventional FRP rods like the reinforcing member in Takahashi et al. do not have so-called "toughness". In other words, they are substantially free from the plastic deformation generally found in steel rods. Therefore, the application field of conventional FRP rods is limited to applications which do not require material toughness.

SUMMARY OF THE INVENTION

Accordingly, it is an object of the present invention to provide an FRP rod material which shows stress-strain behaviour similar to that of steel rods, and which can be suitably used as, for example, a reinforcement in place of steel rods.

It is another object of the present invention to provide an FRP rod material with good heat resistance.

With these and other objects in view, one aspect of the present invention provides an FRP rod material including an elongated matrix made of a synthetic resin, a plurality of first elongated textile elements, and a plurality of second elongated textile elements. The first and second elements are embedded within the matrix, parallel to each other along the matrix. Each of the first elements is composed of a plurality of yarns braided to form it. The second elements have a lower breaking elongation rate than the first elements. Preferably, each of the first elements is a twine or a braid. When a tensile strength test is given for such a rod material, the first elements elongate further after the second elements break. In this manner, the stress-strain curve of the rod material is given as having a high elastic modulus in the elastic region and a large breaking elongation since the first elements having a excellent elongation rate cooperate with the second elements having the high elasticity. In other words, the rod material shows a stress-strain behavior similar to that of steel rods. Accordingly, a novel rod material for use as a building material can be provided which has such advantageous FRP characteristics as being lightweight, having anticorrosion and nonmagnetization properties, and which can be used as, for example a reinforcing bar in place of a steel rod.

In case that each of the first elements is a twine, each of the yarns constituting the twine may be composed of a plurality of monofilaments twisted together or of a bundle of monofilaments. Each of the second elements may be composed of a bundle of monofilaments. Preferably, the twine has at least two types of yarns, one type having a higher elastic modulus than the other type.

In case that each of the first elements is a braid, each of the yarns constituting the braid may be composed of a bundle of monofilaments, and each of the second elements may be composed of a bundle of monofilaments. Preferably, the braid is of a hollow construction having a longitudinal internal bore, and each braid having at least one second element received in its bore as its core yarn.

The outer surface of the rod material, preferably, is covered with a heat-insulating layer. The layer may be made of alumina ceramics, silicon oxide ceramics, boron oxide ceramics, or titanium oxide ceramics.

Each of the monofilaments may be made of a glass fiber, a carbon fiber, a boron fiber, an alumina ceramic fiber, a silicon oxide ceramic fiber, a steel fiber, a vinylon fiber, a nylon fiber, a polyester fiber, or an aramide fiber.

The content of the first and second elements in the rod material may be within the range of about 20 to 80% by volume. The content of the first elements in the first and second elements may be within the range of about 20 to 95% by volume.

According to another aspect of the present invention, there is provided a rod material including an elongated matrix made of a synthetic resin, a plurality of first elongated textile elements, and a plurality of second elongated textile elements. The first and second elements are twisted to constitute a single body and are embedded within the matrix along the matrix. Each of the first elements is composed of a plurality of yarns braided together. The second elements have a lower breaking elongation rate than the first elements. Preferably, each of the first elements is a twine or a braid. When a tensile strength test is given for such a rod material, the second elements adjacent to the center of the material break at first, and the other second elements away from the center break in turn. This sequential fracture is caused since the elongated elements away from the center receive a greater twisting effect and show larger elongation properties than those adjacent to the center. Upon the fracture of the second elements, the first elements are subjected to a small impact load. After the second elements break, the first elements elongate further. Accordingly, the stress-strain curve of the rod material is very similar to that of steel rods.

The twine preferably has two types of yarns, one type having a higher elastic modulus than the other type.

A heat-insulating layer may be coated on an outer surface of the rod material The heat-insulating layer may be made of alumina ceramics, silicon oxide ceramics, boron oxide ceramics, or titanium oxide ceramics.

BRIEF DESCRIPTION OF THE DRAWINGS

The invention will now be described by way of example with reference to the accompanying drawings in which:

FIG. 11 is a cross-sectional view of another modified form of the rod material in FIG. 7;

FIG. 12 is a load-strain diagram of a roving-rod and a twine-rod;

FIG. 13 is a load-strain diagram of a roving rod and a braid-rod; and

FIG. 14 is a presumed load-strain diagram of rod materials according to the present invention in comparison with that of a steel rod;

DETAILED DESCRIPTION OF THE PREFERRED EMBODIMENTS

Figure 1:
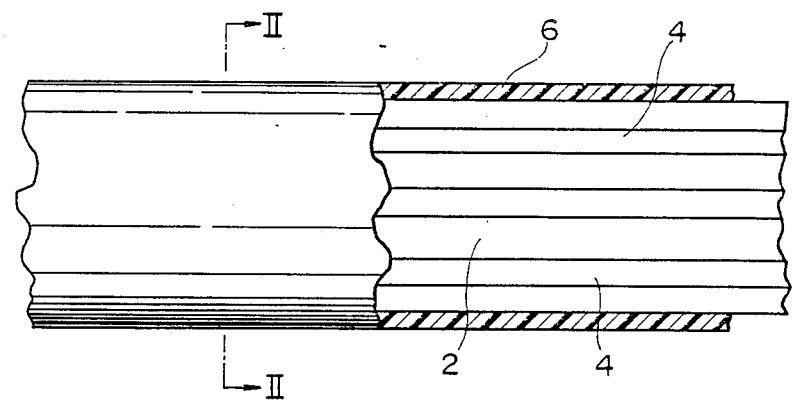
FIG.1 is a fragmentary front view, partly in section, of a rod material according to the present invention.

Like reference numerals designate corresponding parts throughout the drawings, and descriptions of the corresponding parts are omitted after once given.

Figure 2:
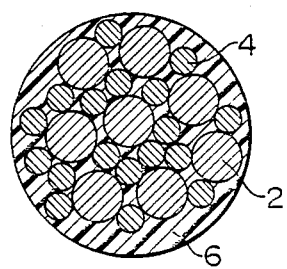
FIG. 2 is a view taken along the line II—II in FIG. 1.

FIG. 1 and FIG. 2 illustrate a rod material according to the present invention. The rod material has a plurality of twines 2 as first elongated elements and a plurality of rovings (or tows) 4 as second elongated elements. The twines 2 and the rovings 4 are irregularly mixed while kept parallel to each other, and are embedded within an elongated matrix 6 along the same while receiving a slight amount of tension.

Figure 3:
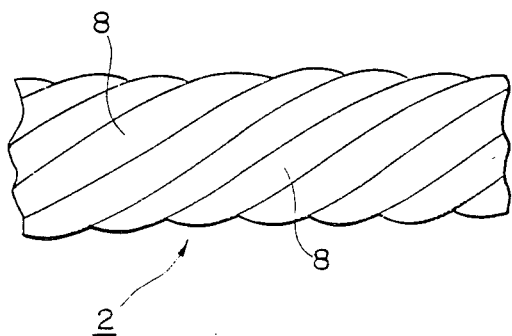
FIG. 3 is an enlarged fragmentary front view of a yarn in FIG. 1.

As shown in FIG. 3, each twine 2 consists of a plurality of yarns 8 twisted to form the twine 2. Each of the yarns 8 consists of approximately 400 to 25000 monofilaments twisted together. In order to form a twine 2, a concentric twist, a bunch-stranded twist, a composite twist or any other twist must be employed. Preferably, each twine 2 has two types of yarns, one type having a higher elastic modulus than the other type. One type is, for example, an aramide yarn, and the other type is, for example a nylon yarn. The number of twists of the twine 2, which means how many times the twine 2 of a unit length is twisted, may be adjusted to give the twine 2 a proper elasticity.

Each roving 4 consists of approximately 400 to 25000 monofilaments bundled to form the roving 4. The monofilaments constituting a roving 4 may be the same type as or a different type from the monofilaments constituting a yarn 8. Those monofilaments forming the roving 4 or the yarn 8 may be glass fibers, carbon fibers, boron fibers, alumina ceramic fibers, silicon oxide ceramic fibers, steel fibers, vinylon fibers, nylon fibers, polyester fibers, aramide fibers, or the like. One type of or a combination of at least two types of the monofilaments exemplified above may be used for forming the roving 4 or the yarn 8. Preferably, those monofilaments are used after being given a surface treatment such as silane and boron according to the type of the matrix 6.

The matrix 6 is made of thermosetting resin such as vinylester resin, epoxy resin, unsaturated polyester resin, polyurethane resin, diallylphthalate resin, and phenyl resin, or thermoplastic resin such as polyacetal resin, saturated polyester resin, polyamide resin, polystyrol resin, polycarbonate resin, vinyl chloride resin, polyethylene resin, polypropylene resin, and acrylic resin. It depends on the applications of the rod material which type of the resin exemplified above is chosen to form the matrix 6.

The rod material contains approximately 20 to 80% by volume of the first and second elements 2 and 4. A rod material containing less than 20% of them can not obtain a sufficient tensile strength. However, it is difficult to manufacture a rod material containing more than 80% of them. The content of the twines 2 in the first and second elements 2 and 4 is within the range of approximately 20 to 95%, preferably 50 to 90% by volume. The less twines 2 the rod material contains, the lower breaking elongation rate it can obtain. A rod material having a twine content less than 20% shows such a stress-strain behavior that the twines 2 break as soon as the rovings 4 break.

The rod material having the structure described above is prepared by carrying out the following processes. Predetermined number of the twines 2 and the rovings 4 are continuously fed into a resin dipping tank containing a noncured synthetic resin and are impregnated with the resin. The twines 2 and the rovings 4 are then bundled to form a single body, and are drawn through a drawing die while subjected to a predetermined back tension. And then the resin is cured to form a rod material. The resin must be cured while the tension acts on both the twines 2 and the rovings 4.

In the rod material having the structures described above, the rovings 4 have a substantially complete elasticity, and the twines 2 have such an elongation rate as to elongate further after the fracture of the rovings 4. That is, the rod material combines properties of both the twines 2 and the rovings 4. Therefore, the stress-strain curve of the rod material shows a high elastic modulus in the elastic region and a high elongation rate in the plastic region, i.e., a high breaking elongation rate. In other words, its stress-strain behavior is similar to that of steel rods. The breaking elongation rate in this description, signifies a elongation percentage upon the fracture of a substance.

Figure 4:
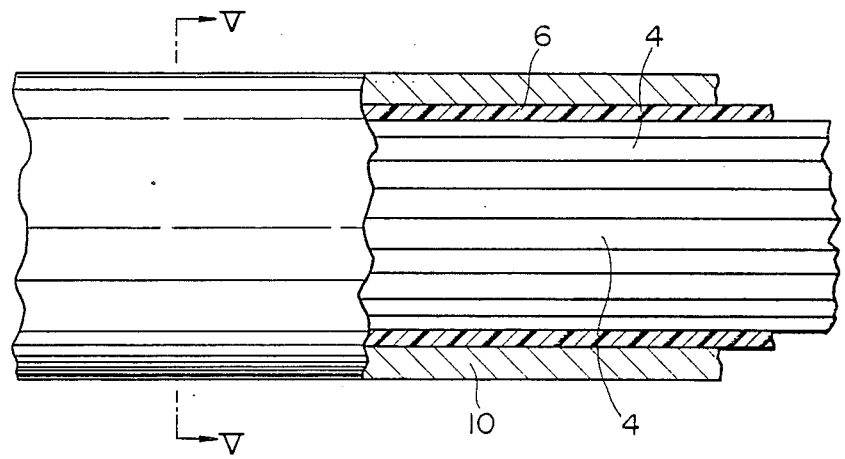
FIG. 4 is a fragmentary front view, partly in section, of a modified form of the rod material in FIG. 1.
Figure 5:
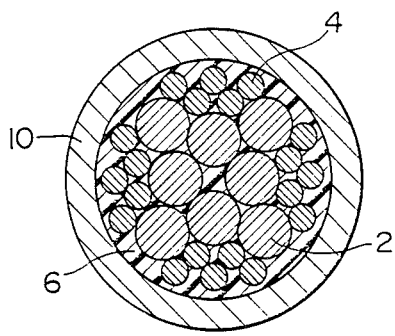
FIG. 5 is a view taken along the line V—V in FIG. 4.

FIGS. 4 and 5 show a modified form of the embodiment in FIGS. 1 and 2, in which a plurality of twines 2 are bundled to form a core of the rod material and a plurality of rovings 4 are disposed along the core to surround the core. Furthermore, a heat-insulating layer 10 is coated on the outer surface of the rod material to protect the matrix 6 and both first and second elements 2 and 4 from heat generated by fire and the like. The heat-insulating layer is made of alumina ceramics, silicon oxide ceramics, boron oxide ceramics or titanium oxide ceramics.

Braids may be used in place of the twines 2 as the first elements.

Figure 6:
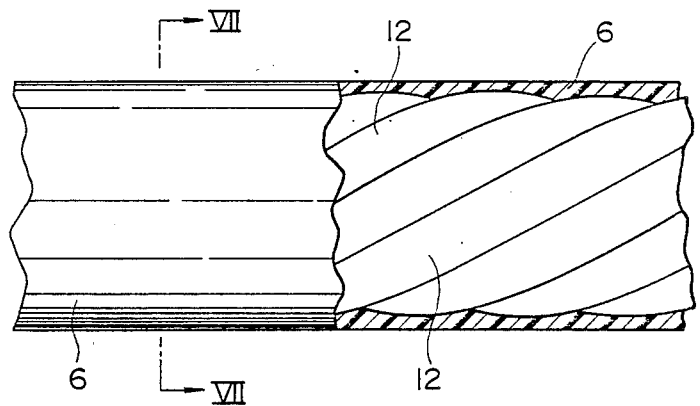
FIG. 6 is a fragmentary front view, partly in section, of another embodiment of the present invention.
Figure 7:
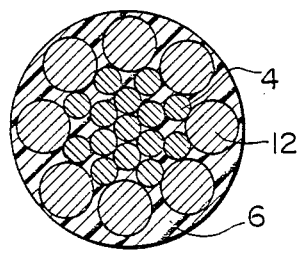
FIG. 7 is a view taken along the line VII—VII in FIG. 6.
Figure 8:
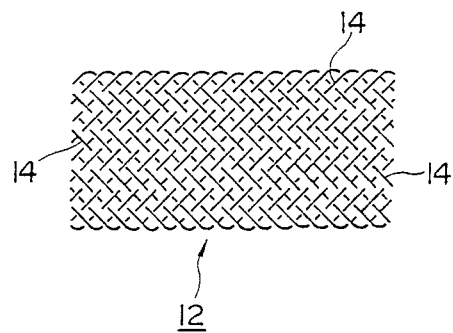
FIG. 8 is a schematic front view of a braid in FIG. 6.

FIG. 6 and 7 show another embodiment of the present invention, in which a plurality of rovings 4 and a plurality of braids 12 are twisted to constitute a single body and are embedded in the matrix 6 along the same. In detail, the rovings 4 are twisted to form a core of the rod material and the braids 12 are twisted around the core. Each braid 12 consists of a plurality of yarns 14 braided to form the flat braid as shown in FIG. 8. Each of the yarns 14 may be a roving of the same type as or of a different type from the rovings 4. In this construction, the rovings 4 away from the center of the rod material receive a greater twisting effect and show larger elongation properties than those adjacent to the center. When a tensile strength test is given for the rod material, the rovings 4 adjacent to the center break at first and then other rovings 4 away from the center break in turn. Therefore, the impact load acting on the braids 12 upon the sequential fracture of the rovings 4 is smaller than that acting on them when all the rovings 4 break at the same time. Thus, the first elements elongate further after the second elements break, Accordingly, the stress-strain curve of the rod material is very similar to that of steel rods.

Figure 9:
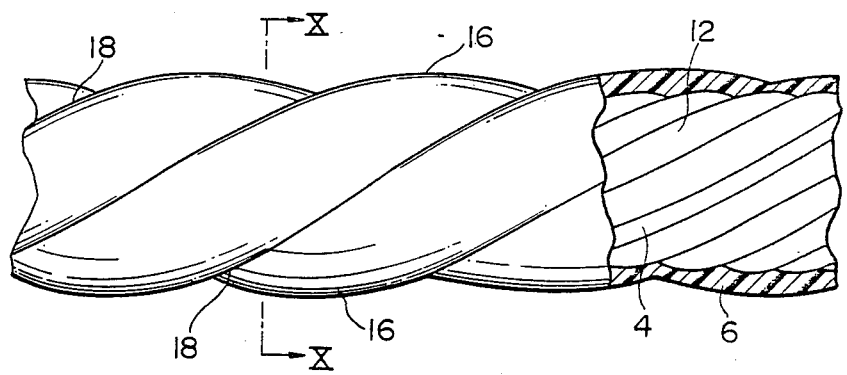
FIG. 9 is a fragmentary front view, partly in section, of a modified form of the rod material in FIG. 6.
Figure 10:
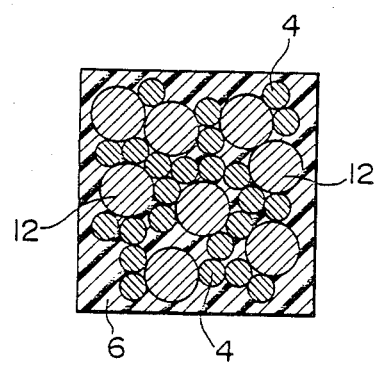
FIG. 10 is a view taken along the line X—X in FIG. 9.

A modified form of the embodiment in FIGS. 6 and 7 is illustrated in FIGS. 9 and 10, in which braids 12 and rovings 4 are irregularly mixed and bundled, after they are impregnated with a resin, to form a single body. The body is then drawn through a drawing die of a rectangular cross-sectional shape, and is formed into a rectangular ( a square in this modification) cross-sectional shape. Before the resin is completely cured, the square rod is twisted. This rod material has substantailly the same effect as that in FIGS. 6 and 7. In addition, the rod material in this embodiment is used as reinforcement in concrete structures since on its surface it has projections 16 and recesses 18 due to the twisting and thus capable of achieving a excellent adhesion between itself and concrete, Another modified form of the embodiment in FIG. 7 is shown in FIG. 11, in which a plurality of cords 20 as first elements are twisted to form a single body in the matrix 6. Each cord 20 is of a hollow construction constituted by a plurality of yarns 14 and having an longitudinal internal bore 22. And in the bore 22 of each cord 20, a plurality of rovings 4 (two rovings in this modification) are received as a core yarn of the cord 20.

In the preceding embodiment, the braids 12 and 20 are formed by yarns 14, i.e. rovings, and include yarns of only one type. However, twist yarns, for example yarns 8, may be used in place of the rovings 14. Also, the braids 12 and 20 may include two types of yarns, one type having a higher elastic modulus than the other type. The cross-sectional positional relationships between the first elements and the second elements are not limited to those in the above embodiments.

EXAMPLE 1

Two rovings both made of carbon fibers of high elasticity and each having a 300 mm length, a 0.49 mm$^2$ cross-sectional area, and a 8100 denier were prepared. Both rovings were impregnated with vinylester resin and bundled to form a test roving rods were prepared in the same manner. Also, a twine having a 300 mm length and composed of an aramide twist yarn and a nylon twist yarn was prepared. The aramide yarn had a 0.12 mm$^2$ cross-sectional area and a 1500 denier. The nylon yarn had a 0.12 mm$^2$ cross-sectional area and a 1260 denier. The twine was impregnated with vinylester resin and the resin was cured to form a test twine rod. Four other test twine rods were prepared in the same manner.

A tensile strength test was given for each of the five roving rods and each of the five twine rods. In this test, a universal tensile tester made by Toyo-Boldwin corporatin was used with its cross-head speed at 50 mm/min. The results; average values for the five test pieces in this case, are plotted in FIG. 12 in which the broken line designates a presumed load-strain curve (load-elongation rate curve in the drawings) of a FRP rod having one fore mentioned twine and two fore mentioned rovings. In addition, the presumed curve may be the one given on condition that the twine upon the fracture of the rovings does not break. However, the load-strain curve of a FRP rod having a hundred above mentioned twines and twenty above mentioned rovings is assumed to be that shown by one solid line in FIG. 14, since the rovings hardly ever break at the same time, but break one by one especially when the rovings are twisted together.

EXAMPLE 2

A braid having a 300 mm length and 0.96 mm$^2$ cross-sectional area was prepared. The braid was composed of 8 rovings made of aramide fibers. Each roving had a 1500 denier. The braid was impregnated with vinylester resin and the resin was cured to form a test braid rod. Four other test braid rods were prepared in the same manner.

A tensile strength test the same as in Example 1 except for the cross-head speed was given for each of the five braid rods. The cross-head speed in this test was 5 mm/min. The average values for five braid rods are plotted in FIG. 13 with the results of the roving rods in Example 1. In FIG. 13, the broken line shows a presumed load-strain curve of a FRP rod having one above mentioned braid and two fore mentioned rovings. However, the load-strain curve of a FRP rod having ten fore described braids and twenty fore mentioned rovings is assumed to be that as shown by the other solid line in FIG. 14, because of the same reason as described in Example 1.

COMPARATIVE EXAMPLE 1

A steel rod having a 200 mm length and a 71.33 mm$^2$ cross-sectional area was prepared. The steel rod was a deformed bar made of hot rolled steel specified by the Japanese Industrial Standard No. G 3112, SD35.

A tensile strength test the same as the one in Example 1 was given for the steel rod. The results are plotted by the phantom line in FIG. 14.

What is claimed is:

1. A rod material for use as a building material, comprising:
    an elongated matrix formed of a synthetic resin in which is embedded a plurality of first elongated textile elements and a plurality of second elongated textile elements all mutually parallel to each other along the length of the rod, each of said first elements being composed of a plurality of yarns braided together and said second elements having a lower breaking elongation rate than said first elements.

2. A rod material as recited in claim 1, wherein each of said first elements comprises a twine.

3. A rod material as recited in claim 2, wherein each of said yarns is composed of a plurality of first monofilaments twisted together, each of said second elements being composed of a bundle of second monofilaments.

4. A rod material as recited in claim 2, wherein each of said yarns is composed of a bundle of third monofilaments, each of said second elements being composed of a bundle of fourth monofilaments.

5. A rod material as recited in claim 2, wherein said twine has two types of yarns, a yarn of one type having a higher elastic modulus than a yarn of the other type.

6. A rod material as recited in claim 1, wherein each of said first elements comprises a braid.

7. A rod material as recited in claim 6, wherein each of said yarns is composed of a bundle of fifth monofilaments, each of said second elements being composed of a bundle of sixth monofilaments.

8. A rod material as recited in claim 6, wherein said braid is of a hollow construction having a longitudinal internal bore, each braid having at least one second element received in the bore thereof as a core yarn thereof.

9. A rod material as recited in claim 2, 3, 4, 5, 6, 7 or 8, further comprising a heat-insulating layer coated on an outer surface of said rod material, said heat-insulating layer being made of a substance selected from the group consisting of alumina ceramics, silicon oxide ceramics, boron oxide ceramics, and titanium oxide ceramics.

10. A rod material as recited in claim 3, 4 or 7, wherein said first, second, third, fourth, fifth, and sixth monofilaments are made of a substance selected from the group consisting of glass fiber, carbon fiber, boron fiber, alumina ceramic fiber, silicon oxide ceramic fiber, steel fiber, vinylon fiber, nylon fiber, polyester fiber, and aramide fiber.

11. A rod material as recited in claim 10, wherein a content of said first and second elements in said rod material is within a range of about 20 to 80% by volume.

12. A rod material as recited in claim 11, wherein a content of said first elements in said first and second elements is in the range of about 20 to 95% by volume.

13. A rod material for use as a building material, comprising:
an elongated matrix formed of a synthetic resin and a plurality of first elongated textile elements and a plurality of second elongated textile elements all being twisted together to form a single elongated body which is embedded within the resin matrix along the length of the rod, each of the first fiber elements being composed of a plurality of yarns braided together and the second elements having a lower breaking elongation rate than the first elements.

14. A rod material as recited in claim 13, wherein each of said first elements comprises a twine.

15. A rod material as recited in claim 14, wherein said twine has two types of yarns, a yarn of one type having a higher elastic modulus than a yarn of the other type.

16. A rod material as recited in claim 13, wherein each of said first elements comprises a braid.

17. A rod material as recited in claim 14, 15 or 16, further comprising a heat-insulating layer coated on an outer surface of said rod material, said heat-insulating layer being made of a substance selected from the group consisting of alumina ceramics, silicon oxide ceramics, boron oxide ceramics, and titanium oxide ceramics.

* * * * *